United States Patent [19]
Onopchenko et al.

[11] 3,928,433
[45] Dec. 23, 1975

[54] PROCESS FOR PREPARING MESITYLENIC ACID

[75] Inventors: Anatoli Onopchenko, Monroeville; Johann G. D. Schulz, Pittsburgh, both of Pa.

[73] Assignee: Gulf Research & Development Company, Pittsburgh, Pa.

[22] Filed: Dec. 18, 1972

[21] Appl. No.: 315,809

[52] U.S. Cl. .............................. 260/524 R; 260/525
[51] Int. Cl.² .................. C07C 63/32; C07C 51/33
[58] Field of Search ................................ 260/524 R

[56] References Cited
UNITED STATES PATENTS 3,261,846   7/1966   Meyer ............................ 260/524 R Primary Examiner—Lorraine A. Weinberger
Assistant Examiner—Richard D. Kelly

[57] ABSTRACT

A continuous process for converting mesitylene to mesitylenic acid which comprises continuously passing mesitylene, oxygen and a solution of a cobalt compound in a lower carboxylic acid at an elevated temperature into a reaction zone wherein mesitylene is converted to mesitylenic acid and water of reaction is formed, removing the reaction product from the reaction zone, separating an azeotrope of unreacted mesitylene and water therefrom, cooling the remainder of the reaction product to recover all mesitylenic acid and recycling the remaining acetic acid-cobalt solution to the reaction zone.

14 Claims, No Drawings

PROCESS FOR PREPARING MESITYLENIC ACID

This invention relates to a process for converting mesitylene to mesitylenic acid in high yields.

Processes for converting mesitylene to oxidation products thereof are known, but, unfortunately, since mesitylene is highly reactive, selectivity to mesitylenic acid is low and large amounts of uvitic acid, trimesic acid and carbonyl and hydroxyl products are obtained. For example, Lopaeva et al. in *Neftekhimiya*, 10, No. 6, pages 875 to 878, November–December 1970 (Ural Polytechnic Institute) and also in *Neftekhimiya*, 10, No. 5, pages 689 to 692, September–October 1970, subject mesitylene to oxidation with air, but without solvent, in the presence of cobalt stearate tetrahydrate at a temperature of 135° to 140° C. and obtain a product containing carbonyl and hydroxyl compounds and only 30 per cent by weight of mesitylenic acid. Saffer in U.S. Pat. No. 2,833,816 subjects mesitylene to oxidation with molecular oxygen in the presence of a cobalt salt and bromine at elevated temperatures and obtains high yields of trimesic acid. Hull in U.S. Pat. No. 2,673,217 subjects mesitylene to oxidation with oxygen in the presence of cobalt and a large amount of acetaldehyde and obtains uvitic acid as product.

We have found that by continuously oxidizing mesitylene in accordance with the procedure disclosed and defined herein not only is mesitylene converted substantially to mesitylenic acid but that the mesitylenic acid so obtained is of high purity and excellent color.

The first step of the process involves continuously passing mesitylene, a gas containing oxygen, and a cobalt compound dissolved in a lower carboxylic acid through a reaction zone wherein there is maintained a selected temperature and pressure.

In the first stage any gas containing molecular oxygen, such as oxygen itself or air, can be used. The amount of oxygen used is at least the amount stiochiometrically required to convert mesitylene to mesitylenic acid. It is preferable, however, to use amounts in excess of those stoichiometrically required, for example, form about 2 to about 20 molar excess.

The lower carboxylic acid will preferably have from two to four carbon atoms, such as acetic acid, propionic acid and normal butyric acid. Of these, we prefer to use acetic acid. The amount of lower carboxylic acid used can be varied over a wide range, as long as a substantially homogeneous liquid phase is present during the reaction. Thus, the initial weight ratio of lower carboxylic acid to mesitylene can be from about 1:10 to about 20:1. We have found, however, that when the initial weight ratio of lower carboxylic acid to mesitylene is in the range of about 1:1 to about 1:5, conversion of mesitylene is somewhat reduced but selectivity rises to above about 90 weight per cent and in some cases substantially quantitative yields of mesitylenic acid are obtained.

Cobalt can be used in the form of any compound, preferably a salt, soluble in the reaction mixture. Thus, the cobalt compound can be inorganic or organic, for example, a cobaltous or cobaltic chloride, sulfate, nitrate, acetate, propionate, butyrate, isovalerate, benzoate, toluate, naphthenate, salicylate, acetyl acetonate, etc. Of these, we prefer to employ cobaltous or cobaltic acetate. The amount of cobalt compound employed can vary over a broad range corresponding, for example, to at least about 0.1 and as high as about 5, or even higher, per cent by weight of cobalt, based on the lower carboxylic acid, although we prefer to employ from about one to about 2 per cent by weight of cobalt. Cobalt in amounts in excess of about 3 per cent, or even 5 per cent, can be used, but are not needed, since increased conversions and selectivity are not obtained.

The reaction herein is preferably carried out in the absence of a promotor. Although higher conversions of mesitylene may be obtained when an initiator is used, selectivity to desired mesitylenic acid may be reduced somewhat. If a promotor is used, it is present in an amount that can range from about 0.1 to about 50 per cent by weight, preferably from about 1.0 to about 5.0 per cent by weight, based on the reaction mixture. Examples of such promotors are aldehydes or ketones, such as acetaldehyde, methyl ethyl ketone, cyclohexanone or their hydrocarbon precursors.

The reaction temperature can be as low as about 80° C. or as high as about 160° C., or even higher, but generally a temperature in the range of about 90° to about 140° C. is satisfactory. Pressures do not appreciably affect the course of the reaction and can be in the range, for example, of about atmospheric to about 5000 pounds per square inch gauge, preferably in the range of about 50 to about 500 pounds per square inch gauge. Residence time can also vary over a wide range, with the shortest reaction times being at the higher reaction temperatures, but in general the reaction times will be in the range of about 5 minutes to about 10 hours, preferably in the range of about 15 minutes to about 3 hours.

At the end of this time the reaction mixture is removed from the reaction zone, water of reaction, together with some unreacted mesitylene, is removed therefrom, mesitylenic acid produced during reaction is recovered and a mixture containing lower carboxylic acid, cobalt compound and unreacted mesitylene, if any, is recycled to the reaction zone, wherein the reaction is continued as defined above. In order to obtain mesitylenic acid of high purity and of good color it is imperative that the recovery thereof be strictly in accordance with the procedure defined hereinafter.

The reaction product removed from the reaction zone will be generally green in color, indicating the presence of cobaltic ions therein. It is possible to recover mesitylenic acid in the reaction product by diluting the same with cold water and then subjecting the resulting mixture to filtration to recover the precipitated mesitylenic acid therein. However, the mesitylenic acid so recovered will be colored, generally green, indicating the presence of cobaltic ions thereon, which are extremely difficult to remove from the surface thereof. By following the recovery procedure defined herein this problem is avoided and mesitylenic acid of high purity and of good color is obtained. This is done as follows.

The reaction product is removed from the reaction zone and depressured to atmospheric pressure, if the same had been at an elevated pressure in the reaction zone. The product mixture is then subjected to a temperature of about 50°, to about 150° C., preferably about 90° to about 100° C., and a pressure of about 0.10 to about 200 pounds per square inch gauge, preferably about atmospheric pressure. In a preferred embodiment an azeotrope of unreacted mesitylene and water of reaction is removed by distillation at atmospheric pressure at a temperature of 94° to 96° C. During the distillation the green cobaltic ions are reduced to their pink divalent state.

After removal of water by azeotropic distillation the residual effluent is cooled to a temperature of about +50° to about −10° C., preferably about 25° to about 0° C., as a result of which mesitylenic acid of excellent purity and good color crystallizes out of solution and can be recovered in any suitable manner, for example, by filtration. The filtrate containing lower carboxylic acid, cobalt and, perhaps, some unreacted mesitylene is then recycled to the reaction zone wherein with additional mesitylene, oxygen and make-up lower carboxylic acid and cobalt compound the reaction is continued as before.

In a preferred embodiment the mesitylene in the azeotrope is also recovered and recycled to the reaction zone. This can be done in any suitable manner. Thus, the azeotrope, which will generally contain about 55 per cent by volume of mesitylene, the rest being water, separates into two layers, a lower aqueous layer and an upper mesitylene layer. Simple decantation is sufficient to effect the desired separation.

The process can be defined by the following.

EXAMPLE 1

Into a one-liter, 316-stainless steel autoclave there was introduced 250 grams of an acetic acid solution containing 7.0 weight per cent of cobaltous acetate tetrahydrate (1.7 weight per cent as cobalt metal) and 235 grams of mesitylene. The autoclave was then brought to the operating conditions of temperature (105° C.) and oxygen pressure (100 pounds per square inch gauge). These temperature and pressure levels were maintained throughout the run. At the end of 1.5 hours oxygen absorption began, indicating start of the reaction. At this point an acetic acid solution containing 7.0 weight percent of cobaltous acetate tetrahydrate and mesitylene were continuously and separately introduced into the autoclave at the rate of about 215 and 183 grams per hour, respectively. At the same time a product mixture was continuously withdrawn from the autoclave at a rate substantially equal to that of the feed, thus maintaining the volume in the autoclave at about 500 cc. After 2 hours of continuous operation in this manner the reaction mixture had attained steady state conditions. A material balance was then made over the next one-half hour. Of the 89.4 grams of mesitylene introduced during this one-half hour period, 75 grams were recovered, along with 16.5 grams of mesitylenic acid. This corresponds to 16 weight per cent conversion of mesitylene and essentially theoretical (99+) efficiency to mesitylenic acid.

The product mixture that was withdrawn from the autoclave was depressured to atmospheric pressure and was found to be green in color, indicating the presence of cobaltic ions. The product was fed into a still wherein at a temperature of about 95° C. and atmospheric pressure water of reaction was continuously removed as an azeotrope with mesitylene having a boiling point of about 94° to 96° C. During distillation the green cobaltic ions were reduced to pink cobaltous ions. The composition of the azeotrope was about 55 per cent by volume of mesitylene and 45 per cent by volume of water. After removal of water, the residual effluent was cooled to 25° C. and then subjected to filtration to recover the mesitylenic acid crystals therein. The filtrate, containing acetic acid, cobalt and mesitylene, was recycled to the reaction zone along with make-up mesitylene. The mesitylenic acid was washed with water to remove residual cobalt salt then dried. Analysis of the mesitylenic acid by vapor phase chromatography showed it to be pure and of good color.

EXAMPLE 2

The run of Example 1 was repeated except that the acetic acid solution and mesitylene were continuously introduced into the reactor at the beginning of reaction at rates of 165 and 104 grams per hour, respectively. After steady state conditions were reached, the material balance was made over a period of 40 minutes. Of the 69.5 grams of mesitylene introduced during the 40 minutes, 53.0 grams were recovered, along with 20 grams of mesitylenic acid. This corresponds to a 23.7 weight per cent conversion of mesitylene and essentially theoretical (99+) efficiency to mesitylenic acid. The purity and color of the mesitylenic acid were excellent.

Obviously, many modifications and variations of the invention, as hereinabove set forth, can be made without departing from the spirit and scope thereof, and therefore only such limitations should be imposed as are indicated in the appended claims.

We claim:

1. A process for converting mesitylene to mesitylenic acid of high purity and of good color which comprises continuously passing a mixture consisting essentially of mesitylene, oxygen, a lower carboxylic acid and a cobalt compound soluble in said lower carboxylic acid through a reaction zone at a temperature of about 80° to about 160° C. for about 5 minutes to about 10 hours to obtain a reaction mixture consisting essentially of mesitylene, mesitylenic acid, cobalt, said lower carboxylic acid and water of reaction, subjecting said reaction mixture to a temperature of about 50° to about 150° C. to remove therefrom an azeotrope containing mesitylene and water, cooling the remainder of the distillation mixture to a temperature of about +50° to about −10° C. to recrystallize mesitylenic acid therein, separating mesitylenic acid from the remainder of said distillation mixture and then recycling the remaining lower carboxylic acid and cobalt to the reaction zone.

2. The process of claim 1 wherein said reaction is carried out at a temperature in the range of about 90° to about 140° C. for about 15 minutes to about three hours.

3. The process of claim 1 wherein the initial weight ratio of said lower carboxylic acid to mesitylene is in the range of about 1:10 to about 20:1.

4. The process of claim 1 wherein the initial weight ratio of said lower carboxylic acid to mesitylene is in the range of about 1:1 to about 1:5.

5. The process of claim 1 wherein said lower carboxylic acid has from two to four carbon atoms.

6. The process of claim 1 wherein said lower carboxylic acid is acetic acid.

7. The process of claim 1 wherein the amount of cobalt compound employed, as cobalt, is in the range of about 0.1 to about five weight percent based on the lower carboxylic acid.

8. The process of claim 1 wherein the amount of cobalt compound employed, as cobalt, is in the range of about 1 to about 2 per cent by weight based on the lower carboxylic acid.

9. The process of claim 1 wherein said cobalt compound is cobalt acetate.

10. The process of claim 1 wherein said distillation is effected at a temperature of about 90° to about 100° C.

11. The process of claim 1 wherein the mixture after distillation is cooled to a temperature of about 25° to about 0° C. to recrystallize mesitylenic acid therein.

12. The process of claim 1 wherein mesitylene is recovered from said azeotrope and is recycled to the reaction zone.

13. The process of claim 1 wherein make-up lower carboxylic acid and cobalt compound and additional mesitylene is introduced into the reaction zone.

14. The process of claim 13 wherein mesitylene is recovered from said azeotrope and is recycled to the reaction zone.

* * * * *